UNITED STATES PATENT OFFICE.

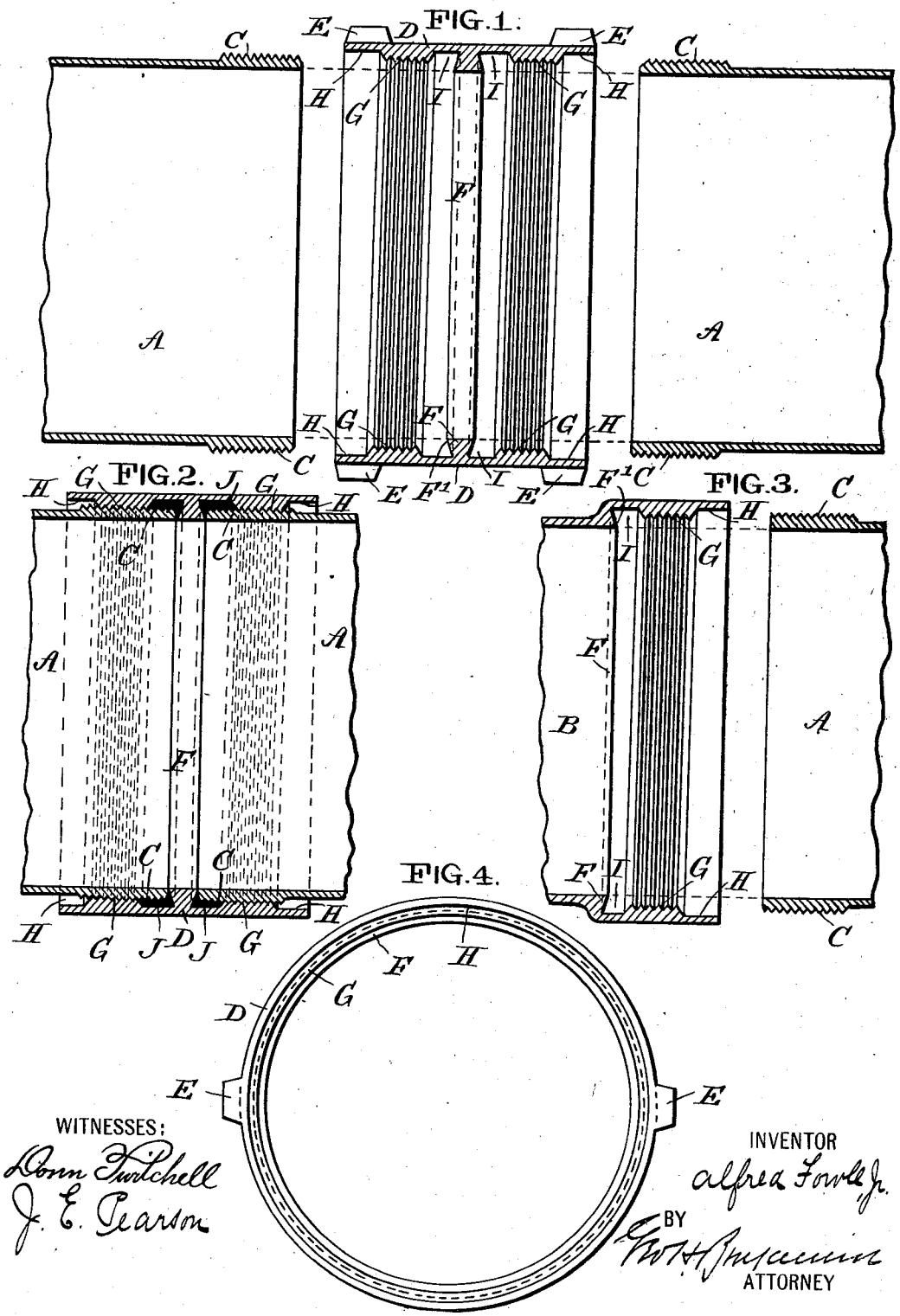

ALFRED FOWLE, JR., OF NEW YORK, N. Y., ASSIGNOR TO THE CENTRAL FOUNDRY COMPANY, OF NEW JERSEY.

PIPE AND PIPE-COUPLING.

SPECIFICATION forming part of Letters Patent No. 670,584, dated March 26, 1901.

Application filed October 6, 1900. Serial No. 32,223. (No model.)

*To all whom it may concern:*

Be it known that I, ALFRED FOWLE, Jr., a citizen of the United States, residing at New York city, county and State of New York, have invented certain new and useful Improvements in Pipes and Pipe-Couplings, of which the following is a specification.

My invention relates to an improved construction of pipes and pipe-couplings; and the object sought to be obtained by the invention is a joint or union between contiguous lengths of pipe which will be not only sufficiently tight to prevent leakage of gases or other bodies transmitted through the pipe, but which may be easily made or effected by unskilled persons.

The character of pipe to which my invention is especially applicable is cast-iron pipe, which is commonly made in lengths of from five to six feet. This character of pipe is usually provided with a hub at one end of somewhat larger diameter than the interior of the pipe, into which when contiguous lengths are united the smaller end of the one length is inserted and secured in position by lead or cement calking. Where such means of uniting pipe lengths is employed, it has been found that through carelessness or inefficiency of the workmen the joints are not always perfect and permit the escape—for instance, when the pipe is used as a sewer-pipe—of noxious and unhealthy gases.

The constructions shown in the accompanying drawings, and these constructions I consider to be equivalent, are such that the contiguous pipes can readily be put together by unskilled persons, and if ordinary care is used the joint will be absolutely tight, and, further, will not present any rough or uneven surface upon its interior where lodgment and accumulation of the material passing through the pipe may take place.

The accompanying drawings will serve to illustrate my invention, and in which similar letters of reference indicate like parts.

Figure 1 is a view showing in longitudinal section the ends of two pipes and between them such a coupling as may be used. Fig. 2 is a similar view showing the coupling applied to the two ends of the pipes and with the joint between them fully made. Fig. 3 is a similar view showing a modification where the coupling is formed integrally with the pipe. Fig. 4 is an end view of the coupling shown in Fig. 1.

In the drawings, A, Fig. 1, represents the ends of two contiguous pipes. In the construction shown in this figure both ends of the pipes A are alike, whereas in the construction shown in Fig. 3 one end is provided with a screw-thread and the other end B with a screw-threaded coupling or socket, as will hereinafter be described. The screw-threaded end of the pipes A is formed by casting the end of the pipe heavier than the body of the pipe and then cutting the screw-thread C on the exterior of the heavy portion.

The coupling shown in Fig. 1 consists of a shell portion D, provided with the external lugs E, by means of which the coupling can be rotated by means of a suitable instrument, such as a spanner or chain wrench. The interior diameter of the shell, it will be observed, is slightly larger than the diameter of that portion of the pipes A carrying the screw-thread C. Located centrally within the shell and projecting inwardly is a web or shoulder F, and located on each side of the web or shoulder and at a distance from it are the screw-threads G. The interior portion of the shell has three transverse diameters—*i. e.*, the diameter of the interior of the shell, the next smallest diameter—*i. e.*, that of the threads—and the smallest diameter, that of the web or shoulder. The web or shoulder is broadest at the top F', and its sides are inclined inward to form reëntrant angles.

In the construction shown in Fig. 3 the shoulder F has but one side—*i. e.*, that toward the end of the pipe. The screw-threads G within the coupling portion are situated at some distance within the faces of the coupling, thereby leaving the space H in front of them. The object of this construction is to guide or center the screw-threads C on the ends of the pipe or pipes A when introduced into the coupling. It will be understood that if the screw-threads G were carried to the outer faces of the coupling—that in the case where pipes are to be connected when arranged vertically—it would be difficult to cause the thread C on the end of the part A to connect with the thread G in the coupling. By arranging the parts as shown this difficulty is avoided.

The space or spaces I between the threads G and the shoulder F are provided for the purpose of acting as a receptacle for packing material, (indicated at J, Fig. 2.) This packing material may be any suitable material which will pack the joint. Preferably I may make use of any metallic alloy, which may be applied hot and which will expand on cooling, or I may use any suitable cement, such as red or white lead, plaster-of-paris, or other similar materials.

It will be observed that the transverse diameter of the coupling at the shoulder F is the same as that of the pipes A. Consequently when the pipe or pipes A are introduced into the coupling the packing material J is forced firmly into the space I, filling the space completely, and the interior surface or surfaces of the pipe or pipes coincide with the surface or surfaces of the shoulder F. By reason of the comparatively sharp edge or edges F' on the shoulder F any superfluous packing material is cut off as the pipe or pipes are forced into the coupling, leaving, therefore, the interior surface of the pipe at the point smooth and with no shoulders or points upon which material transmitted through the pipe can find lodgment.

I am aware that it is not new to increase the thickness of the screw-threaded end or ends of a pipe, and such I do not claim as my invention.

Having thus described my invention, I claim—

1. A pipe having one end threaded, and at the other end a coupling portion, interiorly threaded with the thread located at a distance from the face of the coupling, and having a recess with reëntrant angles located between said screw-thread and the body of the pipe.

2. A pipe having one end threaded, and at the other end a coupling portion, provided with a screw-thread of greater transverse diameter than the interior of the pipe and located approximately midway of the length of the coupling portion, and a recess between the screw-thread and a shoulder with an angular side formed in the body of the pipe.

3. A pipe having one end threaded, and at the other end a coupling portion, provided with a screw-thread located back of the face of the coupling, and a recess between the screw-thread and a shoulder with an angular side formed in the body of the pipe.

4. The combination with contiguous pipe-sections having exteriorly-threaded ends, of a coupling portion provided with interior screw-threads located back of the faces of the coupling, an interior shoulder, and recesses with reëntrant angles between said screw-threads and shoulder.

5. The combination with contiguous pipe-sections having enlarged and threaded ends, of a coupling, provided with interior screw-threads located back of the faces of the coupling, an interior shoulder, and recesses with reëntrant angles between said screw-threads and shoulder.

6. The combination with contiguous pipe-sections having enlarged and threaded ends, of a coupling, provided with interior screw-threads located back of the faces of the coupling, an interior shoulder, recesses with reëntrant angles between said screw-threads and shoulder, and packing material located in said recesses.

In testimony whereof I affix my signature in the presence of two witnesses.

ALFRED FOWLE, JR.

Witnesses:
J. E. PEARSON,
GEO. H. BENJAMIN.